United States Patent [19]

Hung

[11] Patent Number: 5,134,902
[45] Date of Patent: Aug. 4, 1992

[54] AUXILIARY DRIVING DEVICE FOR A ROLLING DOOR

[76] Inventor: Chin S. Hung, No. 579-39, Aur Feng Rd., Ching Shui Chen, Taichung Hsien, Taiwan

[21] Appl. No.: 707,597

[22] Filed: May 30, 1991

[51] Int. Cl.[5] ............... F16H 37/06; F16D 19/00; H02K 7/20
[52] U.S. Cl. .................... 74/661; 74/337.5; 74/665 B; 192/93 A; 310/80; 310/112
[58] Field of Search ............ 310/80, 83, 99, 100, 310/112, 113, 114; 74/837, 337.5, 661, 665 B, 665 Q; 192/20, 54, 93 R, 93 A, 0.98, 93 C

[56] References Cited

U.S. PATENT DOCUMENTS

| | | | |
|---|---|---|---|
| 984,523 | 2/1911 | Baer | 192/93 A X |
| 2,356,590 | 8/1944 | Jacobson | 74/661 |
| 2,728,429 | 12/1955 | Kershner | 192/54 X |
| 3,142,202 | 7/1964 | Müitlbeyer | 74/665 B X |
| 3,575,621 | 4/1971 | Voland et al. | 310/112 |
| 4,160,391 | 7/1979 | Monks | 74/661 |
| 4,319,672 | 3/1982 | Barthélémy | 192/54 X |
| 4,484,871 | 11/1984 | Adman et al. | 74/337 X |
| 4,605,122 | 8/1986 | Biddle | 74/661 X |
| 5,028,828 | 7/1991 | Felkai et al. | 310/83 |

FOREIGN PATENT DOCUMENTS 1-193456  8/1989  Japan ............... 74/665 A

*Primary Examiner*—Leslie A. Braun
*Assistant Examiner*—David E. Henn
*Attorney, Agent, or Firm*—Marger, Johnson, McCollom & Stolowitz, Inc.

[57] ABSTRACT

An auxiliary driving device being attached to a primary driving device of a rolling door and including a gear engaged with a gear wheel of the primary driving device, a motor having an axle, a lower disc with a pinion slidably engaged on the axle, a spring biasing the pinion and the lower disc upward, an upper disc disposed above the lower disc, three balls engaged in the recesses formed in the discs, the pinion moves downward to engage with the gear when the first motor is energized so that the spindle can be driven to rotate by the motor.

1 Claim, 4 Drawing Sheets

AUXILIARY DRIVING DEVICE FOR A ROLLING DOOR

BACKGROUND OF THE INVENTION

1. Field of the Invention

The present invention relates to a driving device, and more particularly to an auxiliary driving device for a rolling door.

2. Description of the Prior Art

Typical rolling doors are generally controlled and driven by a motor which is energized by alternating current. When interruption of service, the motor can not be energized so that the rolling door can not be operated. A guy chain is provided to actuate the rolling door when interruption of service. However, the guy chain should be operated manually, the open and close operations of the rolling door is very slow when actuated manually via guy chain. This is very inconvenient, particularly in case of emergency.

The present invention has arisen to mitigate and/or obviate the afore-described disadvantages of the conventional rolling doors.

SUMMARY OF THE INVENTION

The primary objective of the present invention is to provide an auxiliary driving device which is capable of driving a rolling door when interruption of service.

In accordance with one aspect of the invention, there is provided an auxiliary driving device which is attached to a primary driving device of a rolling door and includes a first motor having an axle, the primary driving device including a second motor having a gear wheel fixed to a spindle thereof, a gear disposed on the first motor and located beside the axle of the first motor and engaged with the gear wheel of the primary driving device, a first disc having a pinion formed integral therewith and having a hole formed in a center thereof for receiving the axle of the first motor, the first disc rotated in concert with the axle of the first motor and slidable up and down along the axle, a spring biasing the pinion and the first disc upward, the first disc having three recesses formed in an upper surface thereof, a ball received in each of the recesses, a second disc rotatably disposed between the cap and the first disc and having three recesses formed in a lower surface thereof and engaged on the balls, the first disc and the pinion are caused to move downward away from the second disc when the first motor is energized so that the pinion is caused to engage with the gear and so that the spindle of the second motor can be driven by the first motor.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
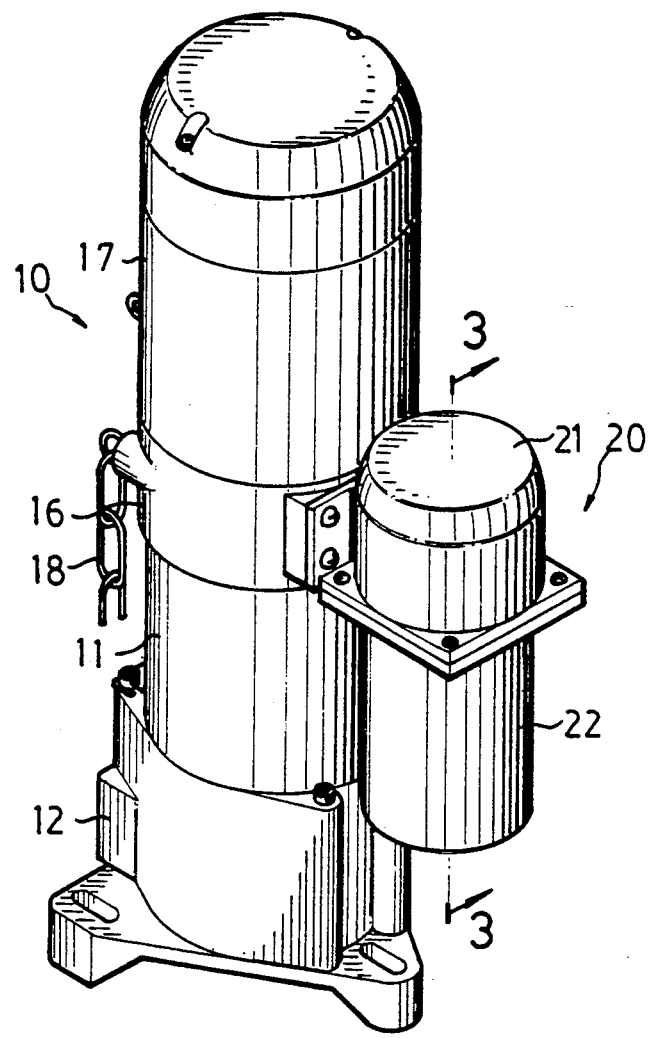
FIG. 1 is a perspective view of an auxiliary driving device in accordance with the present invention which is attached to a primary driving device.
Figure 2:
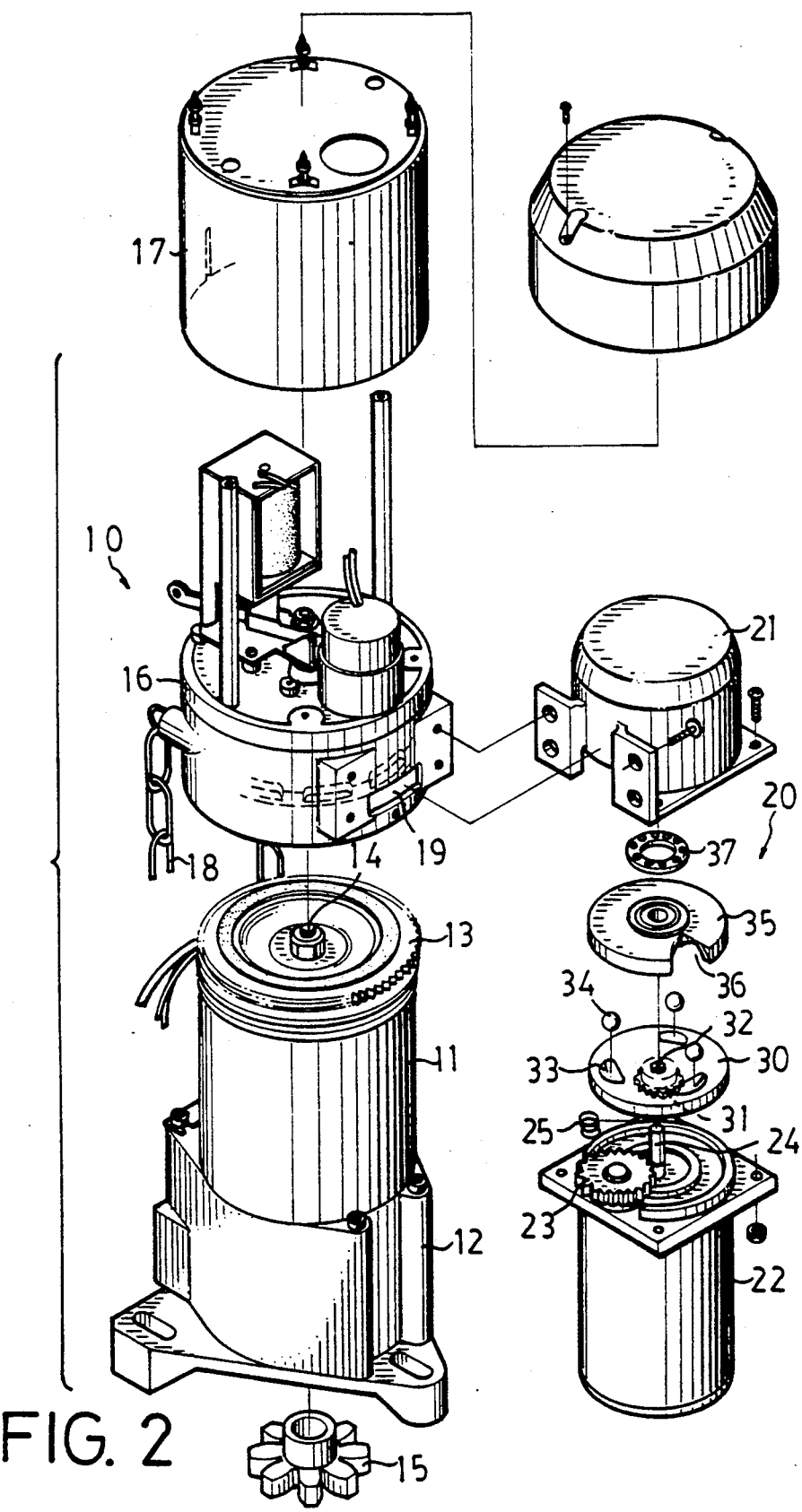
FIG. 2 is an exploded view of the driving devices.

Referring to the drawings and initially to FIGS. 1 and 2, an auxiliary driving device 20 in accordance with the present invention is generally attached to a primary driving device 10 which includes a motor 11 disposed on a seat 12 and having a gear wheel 13 and a gear 15 fixed to an upper end and a lower end of a spindle 14 thereof respectively, and a housing 16 and a casing 17 disposed upon the motor 11. The gear 15 is coupled to drive a rolling door. A guy chain 18 is engaged in the housing 16 and is coupled to the spindle 14 of the motor 11 so that the gear 15 can be actuated to rotate manually. An opening 19 is formed in the housing 16 and is located beside the gear wheel 13. The primary driving device 10 is not related to the present invention and will not be described in further details.

Figure 3:
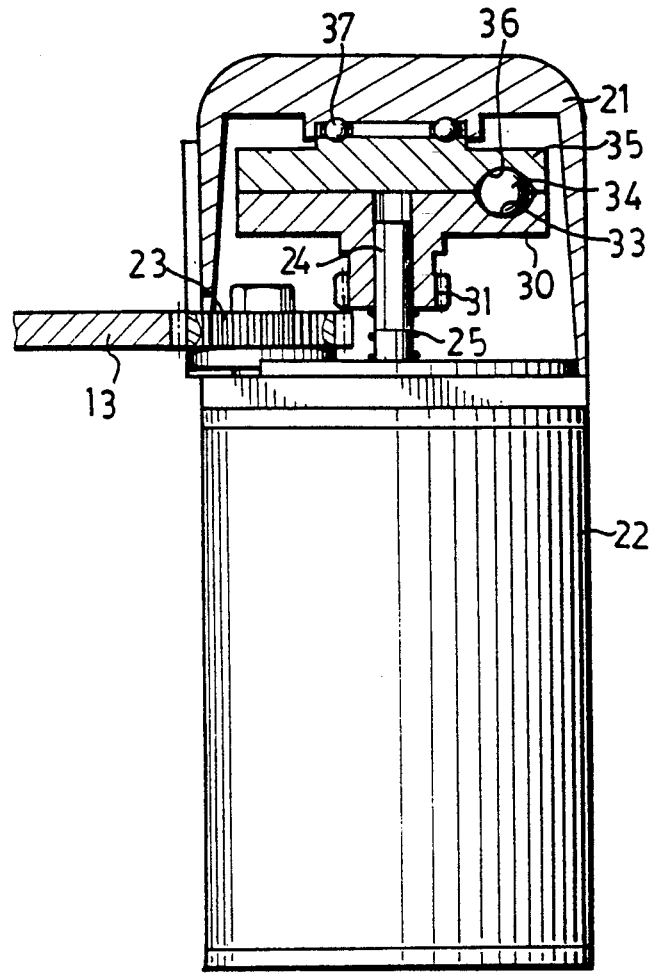
FIG. 3 and 4 are cross sectional views taken along lines 3—3 of FIG. 1.

Referring next to FIG. 3, and again to FIG. 2, the auxiliary driving device 20 comprises a cap 21 fixed to the housing 16 and a motor 22 coupled to the cap 21. A gear 23 is disposed on the motor 22 and located beside the axle 24 of the motor 22, the gear 23 extends through the opening 19 of the housing 16 and is engaged with the gear wheel 13 of the primary driving device 10. The axle 24 has a guiding means, such as has a hexagonal cross section. A spring 25 is disposed around the axle 24. The motor 22 is electrically connected to a battery (not shown).

A first disc 30 has a pinion 31 formed integral therewith and has a hole 32 formed in the center thereof for slidably receiving the axle 24. The hole 32 has a guiding means, such as has a hexagonal cross section engaged with the guiding means of the axle 24 so that the first disc 30 rotates with the axle 24 and the first disc 30 is movable up and down along the axle 24. The pinion 31 is located below the first disc 30 and is coaxial with the first disc 30. The spring 25 biases the pinion 31 and the first disc 30 upward so that the pinion 31 is not engaged with the gear 23. Three curved recesses 33 are formed in the upper surface of the first disc 30 and are equally spaced. A ball 34 is received in each of the curved recesses 33. A second disc 35 has three curved recesses 36 formed in the lower surface thereof and engaged on the balls 34 respectively. A bearing 37 is disposed between the second disc 35 and the cap 21 so that the second disc 35 is freely rotatable relative to the cap 21. The first disc 30 and the second disc 35 will not be rotated when the pinion 31 is not engaged with the gear 23 and when the motor 22 is not energized.

Figure 4:
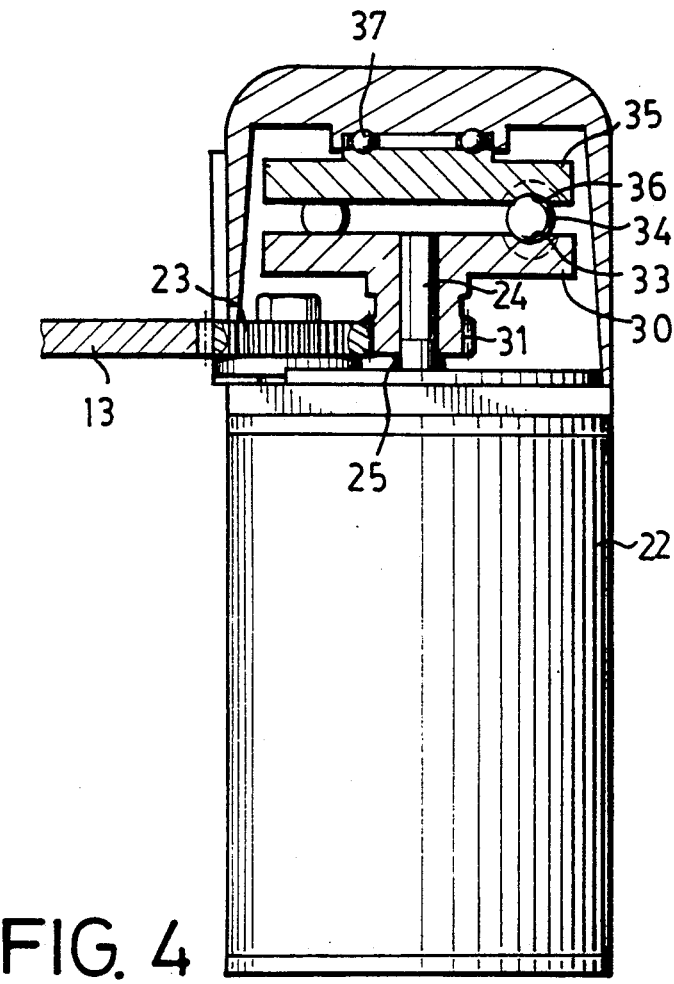
Figure 5:
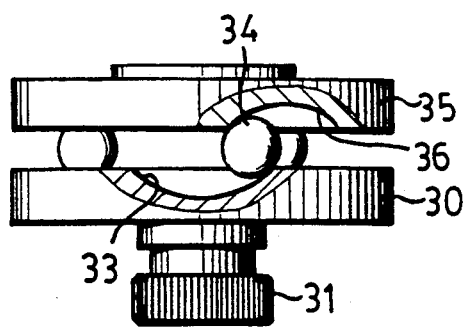
FIG. 5 is a partial cross sectional view illustrating an operation of the present invention.

In operation, referring next to FIGS. 4 and 5, when interruption of service and when the motor 22 is energized, the first disc 30 is driven to rotate by the motor 22; when the first disc 30 rotates, the first disc 30 will rotate relative to the second disc 35 due to the inertia effect, and the first disc 30 will be caused to move downward away from the second disc 35 due to the engagement between the balls 34 and the curved recesses 33, 36 so that the pinion 31 moves downward to engage with the gear 23 and so that the gear wheel 13 and the gear 15 of the primary driving device can be actuated to rotate.

Accordingly, the rolling door can be operated by the auxiliary device in accordance with the present invention when interruption of service.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An auxiliary driving device for a rolling door comprising a first motor and a cap coupled to a primary driving device of said rolling door, said first motor including an axle having a first guiding means formed thereon, said primary driving device including a second motor having a gear wheel fixed to a spindle thereof, a housing disposed upon said second motor of said primary driving device and having an opening formed therein and located beside said gear wheel, a gear disposed on said first motor and located beside said axle of said first motor and extended through said opening and engaged with said gear wheel of said primary driving device, a first disc having a pinion formed integral therewith and located below said first disc, said first disc and said pinion having a hole formed in a center thereof which has a second guiding means formed therein, said axle of said first motor being slidably engaged in said hole and said first guiding means being engaged with said second guiding means so that said first disc rotates in concert with said axle of said first motor and is slidable up and down along said axle, a spring biased between said first motor and said pinion for biasing said pinion and said first disc upward, said first disc having at least three first recesses formed in an upper surface thereof, a ball being received in each of said first recesses, a second disc being rotatably disposed between said cap and said first disc and having at least three second recesses formed in a lower surface thereof and engaged on said balls, said first recesses and said second recesses being curved, a bearing disposed between said second disc and said cap so that said second disc is freely rotatable relative to said cap, said first disc and said pinion being caused to move downward away from said second disc when said first motor is energized so that said pinion is caused to engage with said gear and so that said spindle of said second motor can be driven by said first motor.

* * * * *